United States Patent [19]
Nerlikar

[11] Patent Number: 5,629,981
[45] Date of Patent: May 13, 1997

[54] INFORMATION MANAGEMENT AND SECURITY SYSTEM

[75] Inventor: Virupax M. Nerlikar, Plano, Tex.

[73] Assignee: Texas Instruments Incorporated, Dallas, Tex.

[21] Appl. No.: 283,081

[22] Filed: Jul. 29, 1994

[51] Int. Cl.⁶ .................................................. H04L 9/00
[52] U.S. Cl. ........................... 380/25; 380/23; 340/825.34
[58] Field of Search ..................... 380/23–25; 340/825.34

[56] References Cited

U.S. PATENT DOCUMENTS

| | | | |
|---|---|---|---|
| 4,575,621 | 3/1986 | Dreifus ....................................... | 380/23 |
| 4,691,355 | 9/1987 | Wirstrom et al. .......................... | 380/23 |
| 4,783,798 | 11/1988 | Leibholz et al. .......................... | 380/25 |
| 4,819,267 | 4/1989 | Cargile et al. ............................. | 380/23 |
| 5,053,774 | 10/1991 | Schuermann et al. .................... | 342/44 |
| 5,153,918 | 10/1992 | Tuai ............................................ | 380/25 |
| 5,310,999 | 5/1994 | Claus et al. ............................... | 380/23 |
| 5,319,711 | 6/1994 | Servi .......................................... | 380/23 |
| 5,339,073 | 8/1994 | Dodd et al. ........................ | 340/825.31 |
| 5,508,692 | 4/1996 | Wolfram .................................... | 380/23 |

OTHER PUBLICATIONS

"Software Giant Aiming at the Office," *New York Times*, Jun. 8, 1993, p. C1.

*Hardcopy Observer*, Published by Lyra Research, 'Microsoft at Work', vol. III, No. 7, Jul., 1993, pp. 31–39.

*Hardcopy Observer*, "Microsoft at Work to go Home?", vol. IV, No. 3, Mar., 1994, p. 9.

*Hardcopy Observer*, "Microsoft Gears Up to Supply at Work Print Software to OEM", vol. IV, No. 2, pp. 30–32.

Fite, Jr., Franklin, "The PC Adopts an Embedded Position", *Electronic Engineering Times*, Apr. 25, 1994, p. 46.

*Wall Street Journal*. William M. Bulkeley, "Get ready for the 'smart cards' in health care", May 1993, one page.

*Wall Street Journal*, John J. Keller, "Bells and whistles turn beepers into data receivers", Sep. 1993 two pages.

*Wall Street Journal*, William M. Bulkeley, "Someday, Cards May Make Coins Obsolete (smart cards may replace coin usage)", May 1993, one page.

Standard Register, Advertisement—High Tech Document Security Video, Jul.–Aug. 1993.

*Primary Examiner*—Salvatore Cangialosi
*Attorney, Agent, or Firm*—Ira S. Matsil; James C. Kesterson; Richard L. Donaldson

[57] ABSTRACT

A closed loop, (networked) information management and security system which provides a secure, end-to-end fully automated solution for controlling access, transmission, manipulation, and auditability of high value information comprising an RFID transponder badge 302 and an RF reader transceiver 315 which is associated with a host peripheral or a network. The RF reader transceiver 315 automatically identifies and verifies authorization of the RFID transponder badge holder via a "handshake" prior to allowing access to the host peripheral. The energy generated by the transmission of the interrogation signal from the RF reader means 315 provides a power source which is accumulated and then used to activate a transponder 304 response from the RFID transponder badge 302. The RF reader/transceiver 315 writes the access transaction on either the RFID transponder badge 302 and/or the host peripheral database or the network controller. Alternatively, the RF reader means 315 may be associated via network server with a LAN, WAN, or MAN. Optionally, an RFID badge 302a may be powered by an independent power source such as a flatpak battery 314.

42 Claims, 7 Drawing Sheets

INFORMATION MANAGEMENT AND SECURITY SYSTEM

BACKGROUND OF THE INVENTION

1. Field of the Invention

The present invention relates to a complete, end-to-end, automatic transaction control/monitoring method for transmitting, under variable and high levels of security, high-value business, personal, or Federal/military information, on a real or near real-time basis.

2. Related Art

A "secure document" or "secure information" is any document media (paper, disc, voice, video, etc.) containing U.S. classified documents or information (i.e. "confidential," "secret," "top secret," etc.), business-sensitive, proprietary documents or information, highly personal documents or information, and any document or information where limited and fully controlled/auditable access is desired.

If an individual wishes to send a secure document via telefacsimile, for example, the current method of sending such a secure document is to call the receiving end and somehow make sure by voice communication that the intended, authorized recipient is standing at the other end at the receiving telefacsimile. Once the identity and proximity to the receiving telefacsimile of the intended recipient (mainly, via voice familiarity) is verified, the sending individual sends the document. After sending, the intended recipient provides confirmation to the sending individuals that the document was printed and received.

The same limited security procedure is followed when printing information from an electronic database to a remote conventional printer or other terminal device.

Thus, current hardware and systems involve limited or no automation in handling such secure documents or information on both a local and network basis. The systems and procedures currently available are mainly "person(s)-in-the-loop" systems which require certain labor-intensive actions and a high degree of manual coordination to achieve a limited "secure" operation. The labor-intensive aspect of this coordination procedure greatly increases the duration and costs of transmission while it decreases productivity. Therefore, there is a need in the art to provide a method of transmitting secure documents in a way which does not require such labor-intensive manual assistance.

It is noted that some islands of automation are available, but no end-to-end automation, with full auditability and real-time or near real-time control. Current systems such as a secure telephone unit ("STU") or STU facsimile machines assure no illegal tapping or eavesdropping but do not guarantee that the caller, recipient, or group is positively identified or is an authorized user or recipient. The positive identification and verification of authorization is always performed manually. Thus, there is a need for end-to-end automation, with full auditability and real-time or near real-time control of the transmission of secure documents and information.

A similar problem occurs in handling secure documents and secure information relating to work for various Federal agencies, including, U.S. Department of Defense (DOD). Secure documents and information are often located in a special file cabinet fitted with a piece of securing hardware, e.g., a number lock or combination lock, which is approved by the DOD. Every time the file cabinet is entered, the entering individual must manually enter a myriad of information into a log such as: which document was used; who handled it; date; time; and what was done with the document (i.e. document was copied; document was sent to another individual at another site). The DOD requires auditing and notification at the end of each month of all the people who handled each secure document. At the very least, the DOD requirements compel manual compilation of all the logs which is extremely tedious and costly.

Therefore, there is a need in the art to provide a cost-effective automatic auditing and monitoring capability which also provides electronic time, date and place identification stamps.

Further, these specially secured file cabinets are often grouped in secure rooms that have doors secured by special locks. Upon entry into the room, an additional log must be maintained to provide notification and accounting to the DOD. This additional step also creates additional delay in effective work time and greatly increases costs.

Therefore, there is a need in the art to provide a cost-effective automatic room security which mechanizes the room access logs and thereby decreasing costs and increasing productivity.

Exacerbating the foregoing problems, in order to copy certain secret government documents, only certain "secure" or tempest class copiers may be used so that the copier OPC drum may be cleared after copying and cartridges may be disposed of by only authorized personnel. Before these copies are made, a log sheet must be completed providing the details of the copying of the document. This creates yet another labor-consuming delay that increases costs and decreases productivity. In fact, access logs and usage data are generally maintained manually for secure facilities, information handling equipment, and users.

Therefore, there is a need in the art to provide an automatic information management and security system which eliminates the time inefficiencies and waste associated with manual logging and tracking of copies of high-value, secret documents.

Underlying the entire system is the fact that it is up to the employees and security personnel to verify whether a particular individual has a secret clearance, badge code number, or some other indicia of authorization and identification. Therefore, to prevent improper access, manual or personal direct intervention is required to verify both authorization and need to know in order to prevent improper and unauthorized transfer of secure documents. The verification by employees diverts resources from productive activity. The verification by security personnel results in additional salary or expense overhead.

Therefore, there is a need in the art to provide a system which greatly reduces the need for manual intervention to prevent unauthorized transfer of secure, proprietary and personal documents.

On a related matter, when an individual's authorization is revoked and the individual gains unauthorized access to secure documents a security breach occurs. When this security breach is manually detected, it is impossible to inform all the employees and/or security personnel of the breach in a timely fashion in order to insure manual intervention. In a large company, timely notification and communication of the changing authorizations of employees is relatively impossible. This is because authorization has traditionally been carried in the form of a color-coded badge or the like. As a result, if the security of a document has been breached by use of an authorization which has been terminated or forged, an entire month or more could pass before the monthly DOD audit discovers the security breach.

Therefore, there is a need in the art to provide an automated system for continuously updating comprehensive information about the authorizations of individuals, and to prevent unauthorized access to secure documents at the time access is attempted (real-time control).

Transmission of secure information (documents, data, video, etc.) is even more of a concern, given the planned office integration/automation Systems and Architectures (SW/HW) of the future; a la the ones announced by the Microsoft Corporation ("Microsoft-At-Work", see FIG. 7), Adobe ("Acrobat" for Print Documents), Apple Computer ("OCE"), General Magic ("Magic Cap") etc. covering the emerging multi-media information management systems for office and home. For example, the Microsoft Corporation is working on a new project currently called "Microsoft at Work" which would allow a worker to write a report and, by tapping a key, have 20 copies of the report printed, copied, and collated on one machine, thereby eliminating the step of having an individual take the report from the printer and take it to a photocopy machine where 20 copies are made. See "Software Giant Aiming at the Office," New York Times, Jun. 8, 1993, p. C1. See also, Hardcopy Observer, published by Lyra Research: Vol. III, Number 7, "Microsoft at Work Office," pp. 31–39 (July 1993); Vol. IV, Number 2, "Microsoft-at-Work Software," p. 30 (February 1994); Vol. IV, Number 3, "Microsoft-at-Work For Home Entertainment (SEGA games)", p. 9 (March 1994). In essence, the systems of the future integrate paper and electronic mediums.

Therefore, there is a need in the art to provide an automated information management and security system which would be compatible with the present office technology, yet would be compatible with potential integrated office equipment, networks, and architectures of the future.

The present invention provides an information management and security system which overcomes the shortcomings of the known systems providing various advantages such as instantaneous, multiple secure access(es) and minimizing the total "life-cycle" costs of managing "secure" information (from inception to destruction) utilizing present technology while being also compatible with new technology contemplated for the future. Also provides for transaction database services such as archiving, historic usage trends, transaction reporting/abstracting (user-definable) services.

SUMMARY OF THE INVENTION

It is in view of the above problems that the present invention was developed. The invention is a closed loop information management and security system which provides a secure end-to-end and automated solution for controlling access, transmission, manipulation, auditability control of classified, mission-critical, high-value information managed by DOD, National Security Agency, other Federal Agencies, businesses, and individuals respectively.

The invention has both a generic core or kernel applicable to broad application domains, and a customization scheme (e.g., software, firmware) to support unique user-specific needs. In addition, the basic generic solution kernel of the present invention can be mapped onto existing MIS solutions for ease of upgrade or retrofit.

The present invention allows information management to be "transaction based.". Each automatic information transaction is built around a sequence such as a positive caller and recipient handshake and identification ("ID"), information upgrade (write) record, configuration control (date, time, location and revision stamp), creation of a transaction summarizing "communication data stream" (e.g., ATM cell, frame) packet, destination ID, additional authentication (e.g., voice signature, biographical identification), send and receive date/time, location stamp, etc. The host computer, network server or network controller maintains this "transaction" log automatically and dynamically maintains information authorization, usage, movement, and an upgrade/change log and foils any unauthorized access or tampering and does any real-time reclassification or declassification as required. As such, this is a "transaction" based system that can be enhanced to add fault tolerance, redundancy, software-based access control algorithm creation, etc. to provide a flexible system.

Briefly, in its most generic sense, the present invention comprises a read/write type radio frequency identification ("RFID" Radio Frequency, InfraRed or optical) means (transponder) and a radio frequency (transceiver) reader ("RF reader") means which is associated with a host peripheral or terminal device wherein the RF reader means passively and automatically identifies and verifies authorization of the RFID means via a "handshake" prior to allowing access to the host peripheral or terminal device or an information network. Preferably, the RF reader means writes the complete transaction via a unique "packet") on the RFID means, and/or the host peripheral or terminal or a network server device. In this fashion, the history of all transactions may be stored on the RFID means and/or host peripheral or terminal device. The present invention may be provided commercially in a "securitization kit" to upgrade existing equipment and information-handling facilities.

In a second aspect of the present invention, the RF reader means is embedded, plugged-in, connected or associated with the host peripheral or terminal device. Once a transaction is completed the RF reader means may record and write the transaction on the RFID means, and/or the host peripheral or terminal device, and/or a server database connected or associated with the terminal device. Optionally, the RFID means may further include stored biological data in ROM such as digitized voice signature, retina scan, fingerprints, etc. and other analog sensors (temperature, humidity, pressure, etc.) as well as commercially available physical "position" sensors such as Global Positioning System ("GPS"), coastal navigation system (LORAN), or other satellite/magnetic based positioning system. As an added security feature the RFID means may include electronic hardware and/or software encryption means to statically and dynamically "encrypt" the authorized user identification code, information destination, transaction location, time/date, configuration control, and secondary biological user(s) identification.

In a third aspect of the invention the RFID means may be coupled with an independent power source such as a battery.

The RFID means may comprise an integrated ID, memory storage, and a communications device such as a Personal Computer card ("PC card") which conforms to standards promulgated by the Personal Computer Memory Card International Association ("PCMCIA") having an RF transponder, mass memory, 2-way communication port(s) and input/output data means. Optionally, the RFID means has encryption device (Integrated Circuit) means to encrypt the output data. In addition, the RFID has unique biographical information patterns in Read Only Memory (ROM) for "static" information and "dynamic" position, time, place, date information.

In one preferred embodiment, the RFID means is electronically similar to the "bullet" or flat-pack card disclosed in U.S. Pat. No. 5,053,774 to Schuermann et al., which is hereby incorporated by reference in its entirety.

The RF reader means is preferably an RFID reader module which comprises a plug-in PC card having a communication antenna, an RF module, a control module, and input/out data means. Optionally, the RFID reader means comprise data packetization means, encryption means and bus control means.

The invention provides an advantage by minimizing overall life-cycle-cost to manage high value information from its inception to the end of its usefulness. The invention also provides an advantage by allowing real-time, dynamic classification of information in case of a security breach or authorization changes (levels, users, time, place, etc.).

Because the present invention is transaction-based, the invention also has important applications in "pay-per-use", intelligent electrophotographic toner/development printer cartridges, and ink-jet and thermal transfer cassettes suitable for use in existing and emerging monochrome and color hard copy printing devices such as printers and copiers as well as information transmission/input devices such as telephones, pagers, facsimile machines or telecopiers, modems, scanners, etc.

The unique system elements required to facilitate a pay-per-use type transaction record are a transponder, or reader, and external mass memory for transaction data storage in a peripheral network server and/or "pluggable" Integrated Circuit ("IC") cards commonly referred to in the industry as flash cards or Personal Computer cards ("PC cards") which conform to standards promulgated by the Personal Computer Memory Card International Association ("PCMCIA").

Further features and advantages of the present invention, as well as the structure and operation of various embodiments of the present invention, are described in detail below with reference to the accompanying drawings.

BRIEF DESCRIPTION OF THE DRAWINGS

The accompanying drawings, which are incorporated in and form a part of the specification, illustrate the embodiments of the present invention and together with the description, serve to explain the principles of the invention. In the drawings.

DETAILED DESCRIPTION OF THE PREFERRED EMBODIMENTS

Figure 1:
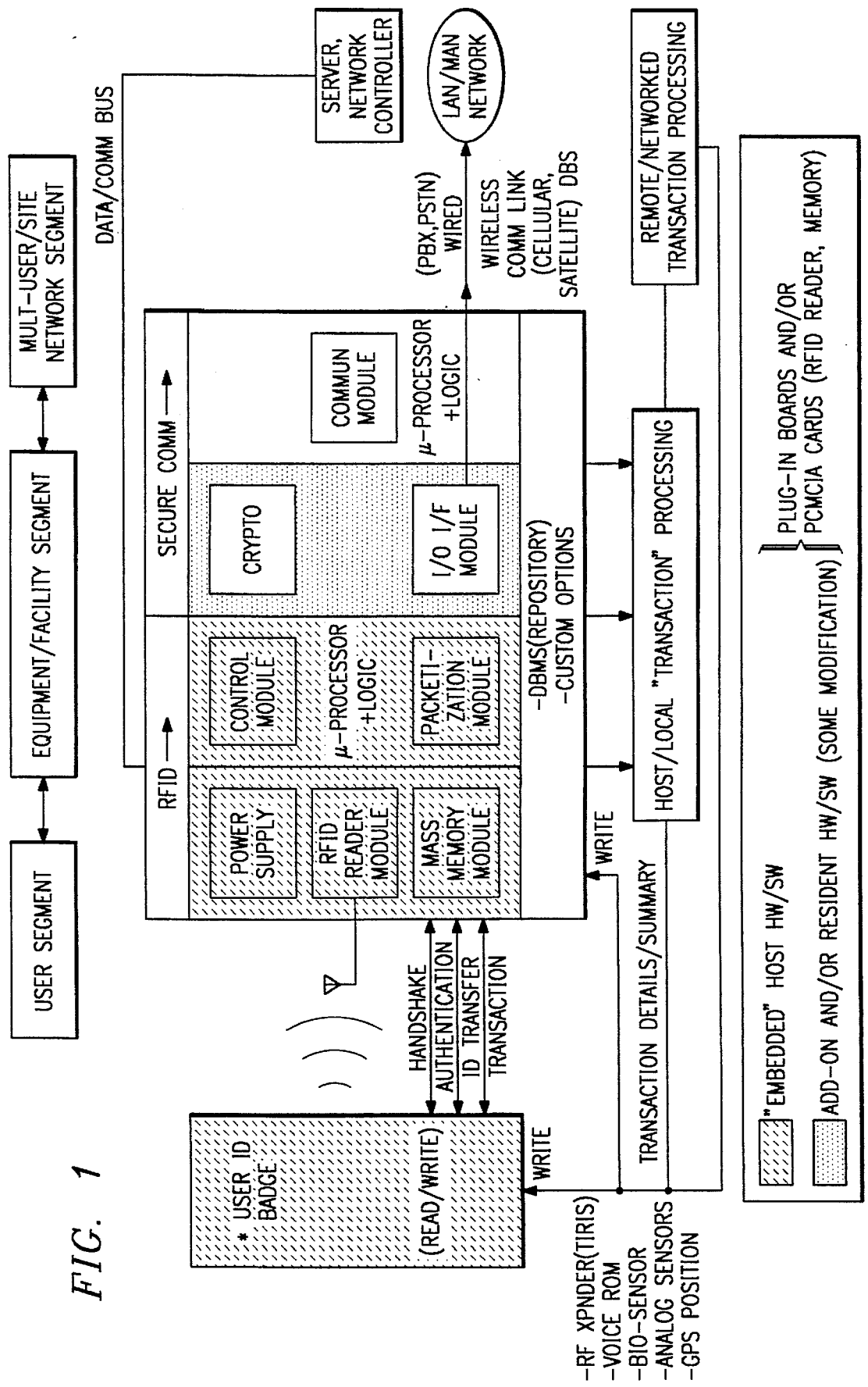
FIG. 1 illustrates a system architecture and partition block diagram of the present invention.
Figure 2:
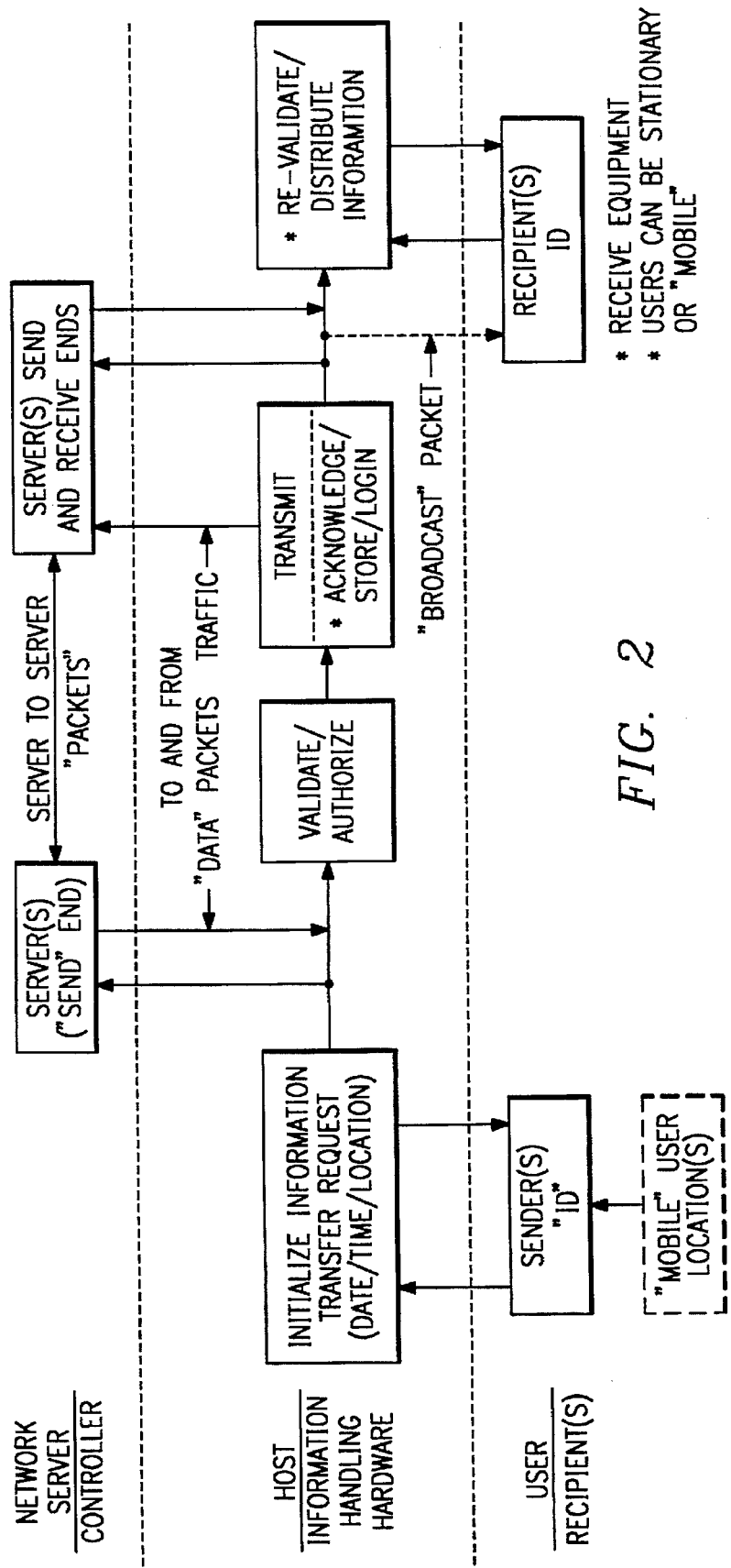
FIG. 2 illustrates a typical secure transaction sequence in accordance with the present invention.
Figure 3A:
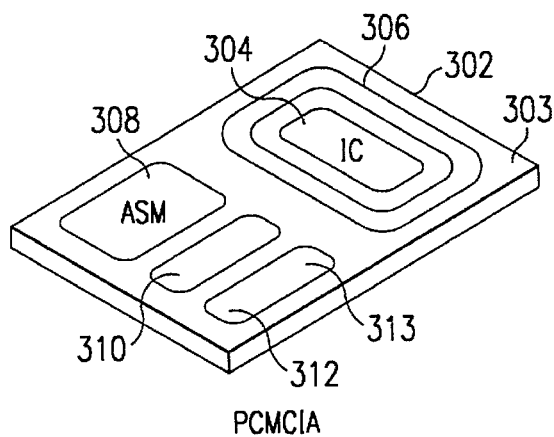
FIG. 3a illustrates in greater detail a passive, user "read/write" type RFID badge suitable for the user segment of the information management and security system.
Figure 3B:
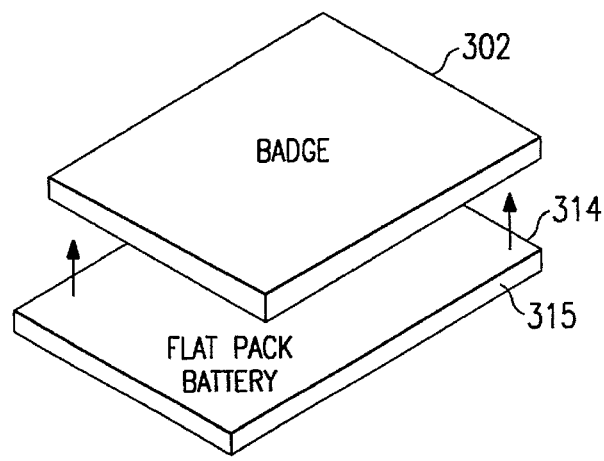
FIG. 3b illustrates an "active" user RFID badge of FIG. 3a and a battery to enhance speed and range of the ID device and the transaction.
Figure 3C:
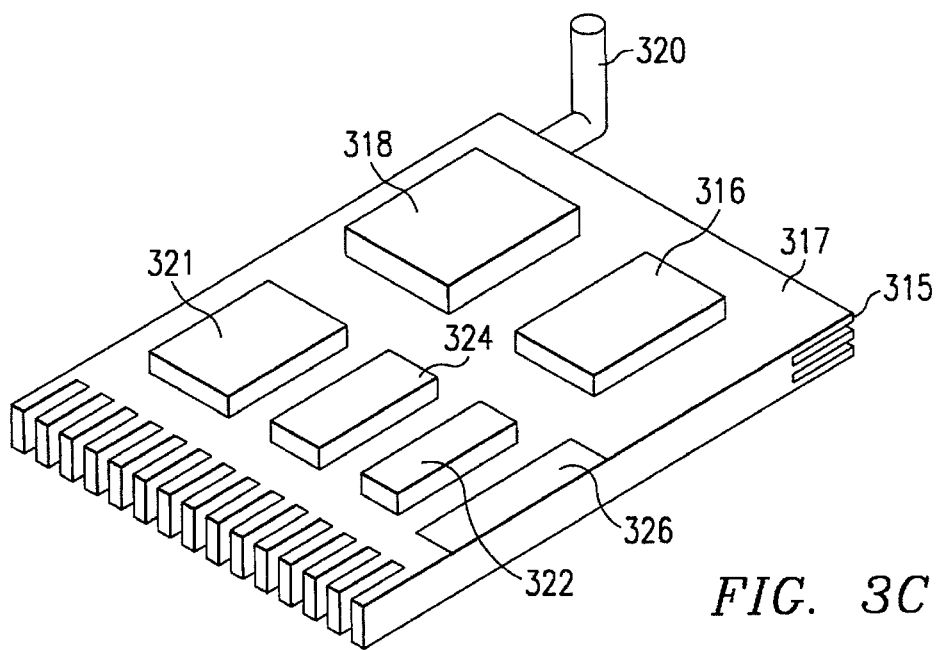
FIG. 3c illustrates a reader "transceiver" module of the present invention.

Referring to the accompanying drawings in which like reference numbers indicate like elements, FIG. 1 and FIG. 2 illustrate one general system block diagram for the present invention while FIGS. 3a, 3b, and 3c depict certain hardware elements which may be used in the present invention.

To provide an overview, in its most generic sense, the present invention comprises an RFID means and a radio frequency reader ("RF reader") means which associated with a terminal device or other equipment such as a lock mechanism, wherein said RF reader means automatically interrogates said RFID means which responds by broadcasting identification so that said RF reader means identifies and verifies authorization of the RFID means and either stores a record of the transaction or communicates a record of the transaction to a server database prior to allowing access to the terminal device or other equipment.

The present invention may be viewed from a transaction standpoint. Each transaction is enabled by the hardware comprising an intelligent identification means, a reader means, and network host hardware. The transaction is also enabled by transaction management software that defines initial handshakes, sequences and packetization scheme(s) for identification and authentication. Further, each transaction will carry a date and time stamp and optionally carry a location stamp which provides auditability and traceability. These stamps may be dynamically and automatically created inside each reader module.

Accordingly, the present invention comprises three segments: a user segment, an equipment or facility segment, and a multi-user or site network segment.

The user segment is comprised of individuals wishing to send and receive information such as secure documents. For the user segment, the present invention requires intelligent identification means, preferably RFID means as stated above. The RFID means may be any device which allows positive identification of the wearer and which provides an ability to communicate with the single or multiple host/network equipment(s) or facility segment(s).

The term "terminal device" is broadly defined as any type of electronic equipment or hardware, e.g. printer, copier, pager, personal computer (PC), facsimile machine, work stations, video, terminal, telephone, VCR, radio, electronic door mechanism, mass memory storage device, data storage device for storing log data, modem, etc. Preferably, the RF reader means provides identification security and then writes the transaction on the (portable or fixed) RFID means and/or a server database connected or associated with the terminal device or other equipment. Further, the history of all transactions may be stored on the RFID means and/or server database. The present invention may be provided commercially in a "securitization kit" to upgrade existing facilities.

In the preferred embodiment, such identification means is preferably in the form of a user RFID badge transponder (hereinafter "RFID badge" or "RFID transponder") or security badge. Such an "RFID transponder" is an active or passive read only or read/write transponder which operates via radio frequency means, infrared means, or other optical means at a low, high or auto-frequency.

Under the present invention, the user segment, at least a group of individuals, wears an intelligent, passive user RFID badge. It is noted that the present invention does not require additional inconvenience on the part of the user segment as wearing dumb ID badges is a fact of life in the defense and business world wherein security clearances are written on badges manually. Thus, the user RFID badge aspect of the invention is an improvement over current technology because security clearance information need not be physically visible for the public to read.

Such a user RFID badge is illustrated in FIGS. 3a and 3b. The uses of each type of user RFID badge are more fully set forth in examples 1 and 2. Both user RFID badges (passive) shown generally at 302 and 303 (active, with battery) commonly include a Personal Computer card ("PC card") which conforms to standards promulgated by the Personal Computer Memory Card International Association ("PCMCIA") having an RF read/write transponder 304, application-specific, electronic mass memory 308, transponder antenna (screened on) 306, and input/output data means 312. Optionally, the input/output data means 312 includes unique encryption (hardware or software) means 313 to decrypt input data and encrypt the output data/packets etc. via a specialty crypro Application Specific IC (ASIC) in the form of a random number generator chip or utilizing hardware or software "crypto keys" for information/date encryption which is user-definable. Optionally, the user RFID badge 310 can also store a person's unique biological digitized data in Read Only Memory ("ROM") 310 for enhanced authentication purposes, e.g. digital voice signature, digitized fingerprints, or digitized eye retina prints, etc.

With reference to FIG. 3b, the user RFID badge shown generally at 302a uses the PC card 303 of FIG. 3a and is physically and electrically joined to a flatpak battery power source 314. Applications specific to this user RFID badge 302a are more fully explored in Example 2.

With reference to FIG. 3c, the equipment or facility segment of the present invention requires an RFID reader means which may be of plug-in or built-in type. The RF reader means is defined as a multi-frequency, range-adaptive radio frequency transceiver preferably in the form of an RFID reader module shown generally at 315 which comprises a plug-in PC card 317 having a control module 316 for controlling an RF module 318 connected to a communication antenna 320, and having input/output data means 322. Optionally, the RFID reader means comprise integrated circuits (ICs) such as data packetization means 321, encryption means IC 324 and bus control means 326 possibly connected via modem (wired or wireless) to the network server.

Encryption means IC 324 is preferably a specialty crypto ASIC similar to that described for input/output data means 313.

The facility segment also may require a LAN/WAN network server, controller or host hardware, not shown. The preferred reader module may operate in a low (up to 400 KHZ) or high (microwave>900 MHZ) frequency range. For example, in the low frequency range the transponder may use Texas Instruments Radio Identification System™ ("TIRIS™") technology. TIRIS™ technology is more fully discussed in the '774 patent.

The network segment requires some type of host hardware to handle and manage the information and security system. The host hardware functions to authenticate authorized user IDs, track roaming user locations, and control configuration of the system as well as revisions in any aspects of control. The network segment also can perform compression or decompression of data, control local area network and wide area network applications, provide a "throttle" in that it could provide a variable transaction "packet" creation/transfer rate of control, provide encryption means and provide multi-user and equipment daisy chaining (add/drop, change priority, etc.). In its management aspect, the network segment can provide functions such as billings, generate reports relating to general usage trends, provide an audit-trail of each/user-defined transaction, control classification and reclassification of both documents and authorized users, provide point-to-point or point-to-multipoint "broadcast" transactions, provide secure communications for roaming users, and other application specific features, such as an automatic/date/time/location stamp for every transaction wherein the location stamp utilizes dynamic code(s) such as GPS location code or "variable" facility codes for added security.

Figure 4:
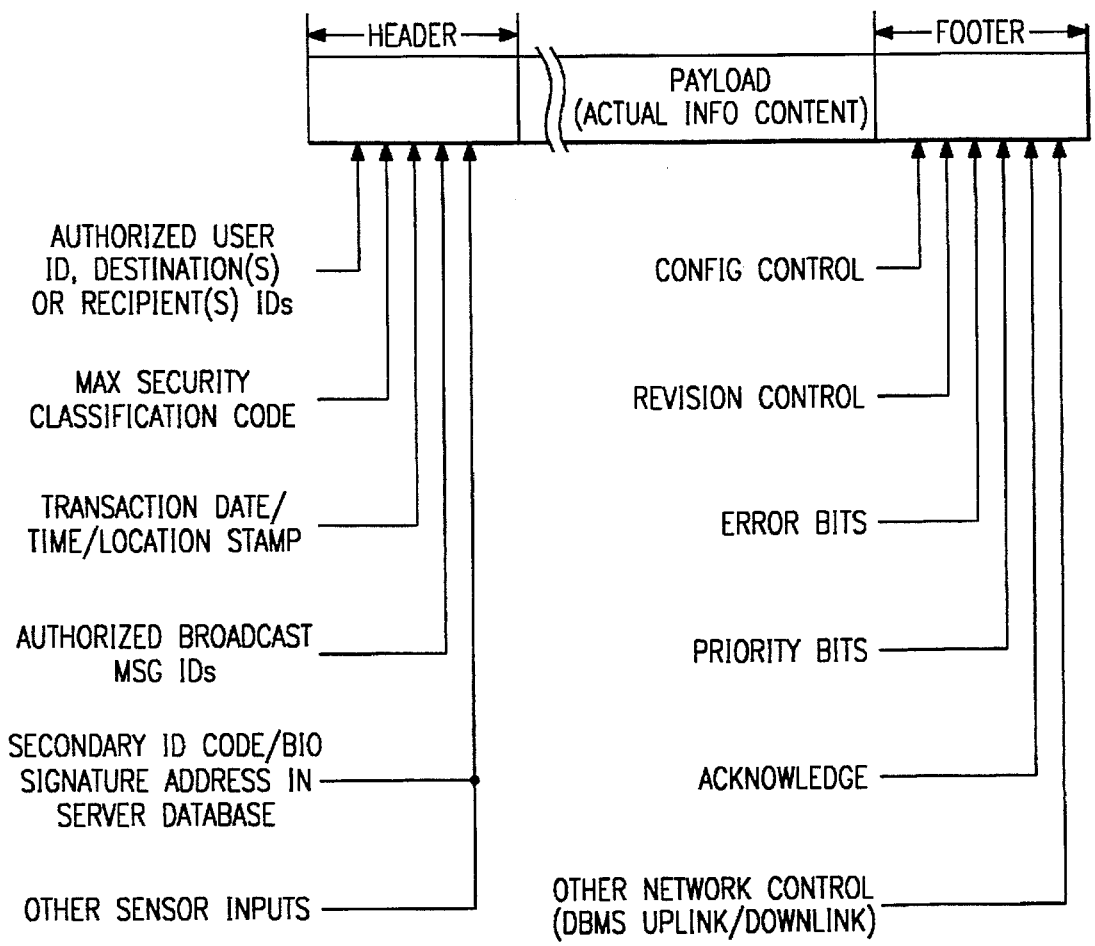
FIG. 4 illustrates one transaction packetization scheme suitable for use in said information management and security system.
Figure 5A:
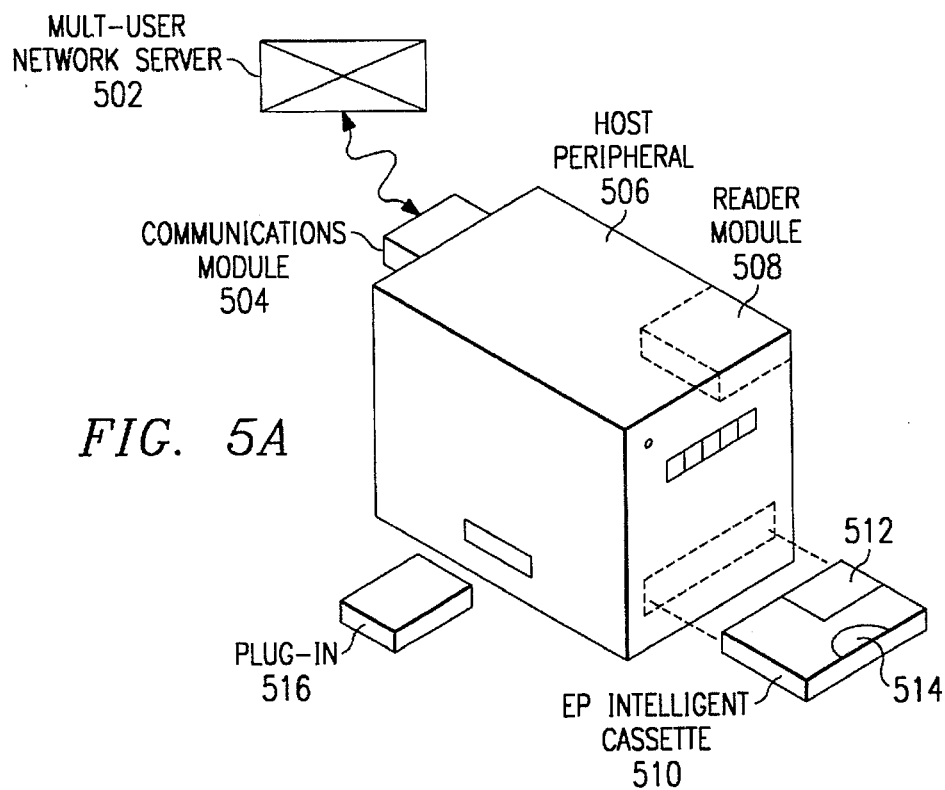
FIGS. 5A and 5B illustrate a general hardware layout in a specific high-value printing cartridge refurbishment application of said information management and security system.
Figure 5B:
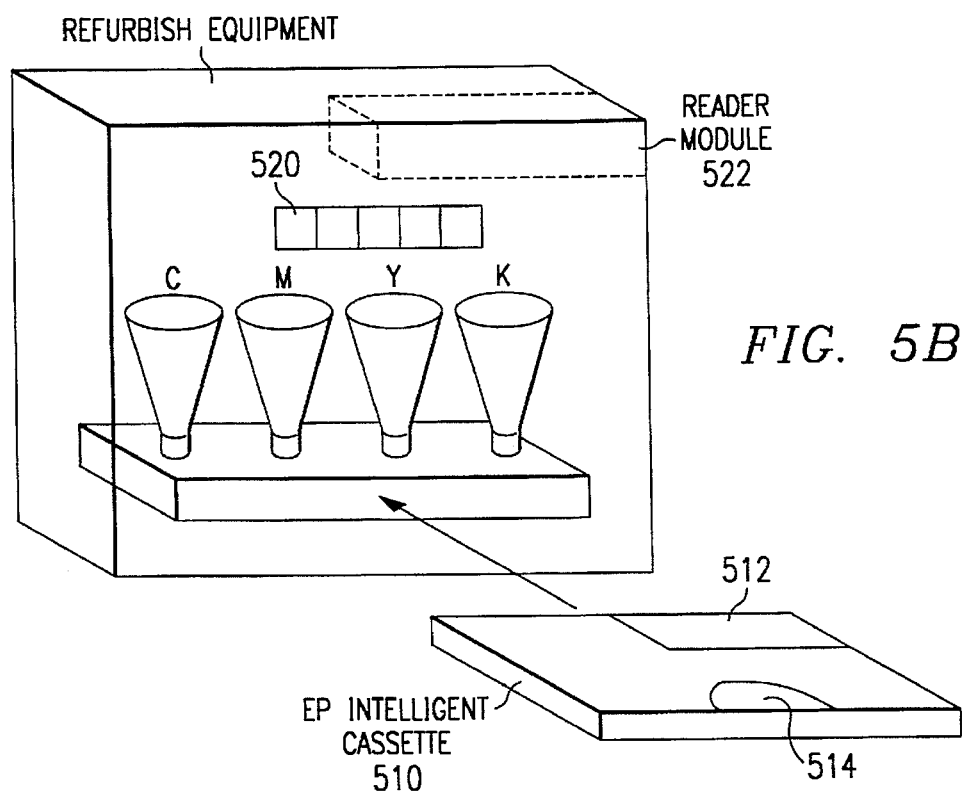

With respect to packetization of data, one preferred, sample packetization scheme is disclosed in FIG. 4. The preferred packetization scheme shows at least five codes that the data packet will contain: the ID number(s) of the user(s), the destination or recipient IDs, and the time, date, and location stamp. It is noted that the location stamp may be provided by an IC chip which automatically stamps the request and provides an audit trail by time and date.

The unique portion of the present packetization scheme is that the location stamp showing the authorized origination and destination(s) of the request is encoded and encrypted. This aspect is critical in the sense of preventing unauthorized entry in a control area. If a person attempts unauthorized entry by using a location code obtained by copying airborne transmissions or stolen badge, etc., access is denied first because the person is unauthorized and second because an authorized user also has a limited number of locations in which transactions are authorized. Information relating to the limited number of authorized locations is stored in a look up table of the host computer or the network server and can be dynamically updated as required for additional security.

It should be emphasized that in FIG. 4, Authorized User ID, Destination, and Recipient IDs are all encrypted, even in the header, using a random number scheme described below, or some other similar scheme. Thus, even if unauthorized personnel obtains the transmitted packet, the unauthorized personnel would be unable to decrypt or decode the packet to obtain the real code, and even if the real code is obtained, the host or network server could dynamically change the location code on an everyday basis to foil unauthorized copying or pirating of the code.

With respect to FIG. 4, it should be further noted that forward and return packets have user-definable data fields, transaction definition and interlocking instruction, and crypro fields including error control. Techniques well known in the art such as compression/decompression of data and buffering may also be used to achieve "adaptive rate" network capacity optimization.

With respect to encryption of data, a decoding or decryption approach attempted by unauthorized users of RF, broadcast user ID/voice signature or other personally unique data is the capture and duplicate approach. One way to combat this approach is to deploy a "random number seeding" algorithm to continually and very frequently change the "ID data".

This encryption algorithm may be embedded in the transponder device (RFID or Infrared or optical ID) itself or in a separate encryption chip or integrated encryption/ packetization chip. A short series of transmitted transactions below the RF equipped "object" under protection and the other RF technology identification device could be as follows:

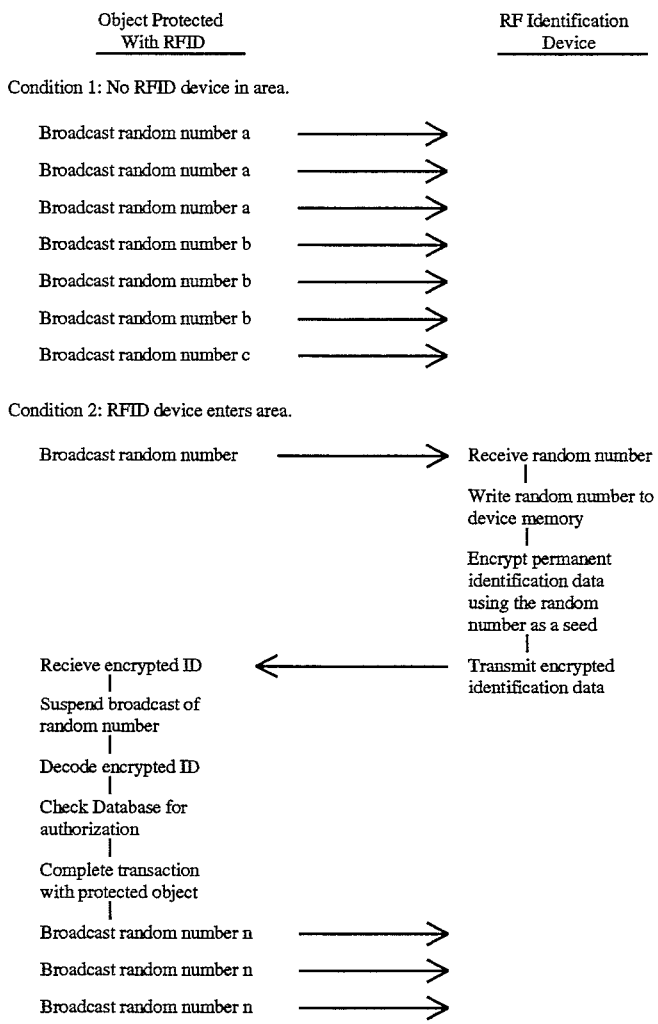

It is noted that the user identification code may contain authorized location codes, coded by simple assignment or the Global Positioning System ("GPS") convention of latitude and longitude, which may be merged into the user identification code itself and may be changed and/or encrypted. As a result, both standing data and dynamic data exists in the identification code, the mix and frequency of change of which is dependent upon the level of security desired. This dynamism is critical to maintaining extremely high levels of security in the system. In the event the user identification code carried by the RFID badge is copied in order to gain unauthorized access to information from a location different from that originally authorized (e.g. a computer hacker, misuser/abuser attempting access to secure information or documents via modem), this access would be denied. This packetization scheme combining static code and dynamic code which is controlled and changed according to some predetermined algorithm by the controller or the network server based on the requirements of the using community appears unique as past schemes appear to take static data and recombine the data "on the fly."

A similar system is applicable to other types of terminal devices. For example, for a secure copier or a secured data computer terminal, an identification handshake will now occur in front of each machine as it is approached. The machine will read the individual's badge and optionally request voice signature authentication.

The badge system also provides enhanced security under the present invention. If an individual's badge is stolen, the individual simply calls the network management people regarding the stolen badge. The network management people drop the badge from the authorized user list. Therefore, the present invention can provide real-time configuration control and security control.

The equipment or facilities segment may include an application specific memory (ASM), which is preferably a mass-memory plug-in card, which is not absolutely required for operation of said information management and security system. A suitable card would contain at least forty megabytes of storage capacity and would be characterized by multi-page, user-definable, mapping/layout, input/output, mass memory devices of silicon, gallium arsenide or a hybrid material. This additional ASM could be used to store additional transaction history data as desired. Further uses of this card are set forth in greater detail below.

The present invention also has applications in paging and/or telephone transactions wherein a central office telephone switch (wireline or cellular) has the present invention installed in the switch. When a secure voice transmission is required, a central office switch may store an individual's voice signature in its database for comparison and verification of identity.

With respect to wireless telephonic transactions, central switches have base stations so that with a cellular phone, repeaters transmit the cellular phone signal to the next cell. The cordless/cellular phone itself and/or base station equipment can have RFID readers of the present invention installed as well as other authorization data such as digitized voice bio-signature data.

Another application is in STU transactions. An STU is secure telephone equipment which is required by the Department of Defense before secure communications are discussed regarding secure documents. Thus, a module reader in the equipment or facility segment can be installed in the equipment, the use of which is dependant on the badge worn by the user segment and the control provided by the host hardware in the telephone central switch.

Similarly, the present invention has applications for secure communication radios for the Department of Defense for radio conferencing as well as television conferencing or video conferencing in the future.

EXAMPLE 1

Specific applications exist utilizing a user RFID badge having no battery. Such a badge is illustrated in FIG. 3, wherein a badge comprises a PC card having a read/write transponder, a flat antenna, application specific massmemory, and a chip performing input/output functions, preferably including an encryption scheme. Such an RFID badge may be patterned after the "bullet" described in the '774 patent. Because this badge has no battery, its transponder is of limited range. The user RFID badge derives its power by capturing the energy from RF signals generated by the interrogating RF reader module, and, once a predetermined amount of energy is stored, transmits a coded RF signal in a short transmission burst. This method of RF signal transmission is more fully discussed in the '774 patent described above. This badge integrated RFID/communication badge is approximately the physical size of a regular credit card. A second type of user RFID badge discussed more fully below in Example 2 adds a power source such as a battery.

It is noted that either of the above-described user RFID badges could also include a biological or voice signature in ROM. This information stored in ROM could also be encrypted. All encryption could be performed using any of the encryption means currently available on the market, but preferably based on a random number scheme for complete security.

FIG. 2 illustrates a scenario in which there is a user RFID badge in the user segment, and an RF reader that reads the transponder of the RFID badge in the equipment segment. The equipment has a RF reader embedded or plugged into, for example, a fax machine. As person wearing the user RFID badge approaches the fax machine, the RF reader will read the RFID badge when it comes within reading range, probably a meter or less (for passive). When the person's RFID badge is read, the person's RFID badge makes an automatic handshake with the equipment or facility segment so that the equipment, here a fax machine, recognizes that proximate person corresponds to the identification number on the badge.

As a concrete example embodying FIG. 2, secretary A who is attempting to send a secure document to secretary B, does not have to wait for secretary B to be present before the document is placed in the fax machine. As secretary A approaches the fax machine, the RFID reader interrogates secretary A's user RFID badge and determines the identity of secretary A. When secretary A attempts to send the secure document, the fax machine (the host peripheral) initializes the information transfer request and provides configuration control in the form of a date, time, and location stamp. The fax machine checks in a look up table (located either in a module in the host peripheral/fax machine or by sending a query to the network server) to validate and authorize the information transfer request.

Because the host or network automatically has stored a database of authorized people who are authorized to send facsimiles or handle secure facsimiles at this location, the host or network will verify that secretary A is authorized to send a secure document via a handshake between the RFID reader and secretary A's RFID badge.

Once secretary A sends the document, the network does not transmit the secure document to the receiving facsimile machine. Instead, the network will store the document electronically in the buffer of the receiving fax machine or at the network buffer. At this point, the network can send an indication to authorized secretary B or other authorized recipient(s) at this location that a secure document is waiting to be retrieved. This indication can come in the form of a light appearing on the fax machine, a flashing light on her telephone, or a note on the computer screen, or a combination of any of the foregoing. This aspect is critical to security because the secure document is not automatically printed when secretary B is not present. At secretary B's convenience, secretary B will go to the fax machine. As secretary B approaches the machine, when proximity to the machine permits, a handshake between secretary B's fax machine reader and secretary B's RFID badge will occur. The fax machine will recognize that secretary B is the authorized recipient and has a secure document ready for receipt. At this point, if secretary B's RFID badge or the system utilizes the additional biological or voice signature security feature, the facsimile machine may ask secretary B to say the name or provide a finger for reading or an eye retina for reading. This additional step guarantees that the person wearing the badge is in fact secretary B. After identification is verified, the fax may once again revalidate with the network server the authorization of secretary B to receive the fax and the fax is printed and all transaction details and records are updated automatically.

This concept may be extended commercially. For example, in Automated Teller Machine ("ATM") transactions, use of the user ID badge would allow secure banking transactions. Preferably, the user ID badge in the ATM context would have some biological authentication such as voice signature and could eliminate personal identification numbers currently susceptible to ATM card fraud. In addition, this would increase the speed of transactions currently requiring inspection of card identification and comparison of card identification to the individual carrying the card identification.

Similarly, the present invention may be extended to point of sale terminals and cash registers in the retail world.

Similarly, the present invention may be extended to cover future applications such as a social services card covering Health Insurance or other governmental entitlement programs, including customized high-risk patient ID information cards.

EXAMPLE 2

Specific applications of the present invention exist utilizing a user RFID badge having an independent power source. Thus the user RFID badge of the present example comprises a PC card having a read/write transponder, a flat antenna, application specific mass-memory, and a chip performing input/output functions, preferably including an encryption scheme, and an independent power source. While a user RFID badge having an independent power source has all the specific applications described in Example 1 above, addition of the independent power source would create improvements in those specific applications (i.e. speed, improved reading range) and creates additional applications described below.

A suitable power source is a battery, preferably a common flatpak battery as shown in FIG. 3. This battery is physically glued or welded and electronically connected to the user RFID badge. The addition of a battery transforms the badge into an active, long-range, fast write transponder. Such a battery would increase the range of the transponder up to five times that of the original battery. In addition, such a battery would enable the "read/write" processes in the badge to function faster.

The security badge itself could also be a pager. The badge could be secured physically and electronically to a pager that is carried on the belt or a pocket. Accordingly, the pager would incorporate security features not found in the present paging system.

Currently, pagers are one-way and not secure because the pager broadcast is general in nature, available to all. As a result, information sent via pagers is not secure. Thus, the extent of any pager message that may be sent is to call a certain number (voice page or alphanumeric page), but sensitive information may not be sent.

As alphanumeric pagers are more prevalent, and two-way paging becomes a possibility in the near future, the present invention provides a security feature which allows secure messages to be sent without worrying whether an unauthorized person had access to the page. One of the keys to secure messaging is encryption software which is laid on top of the conventional signal. Encryption (selective polling) allows a sender to control who receives a secure page and, more importantly, who does not receive same.

A powerful aspect of the present invention relies on the ability of the user RFID badge to provide a location stamp. Because a user RFID badge with a flatpak battery has a fairly long range, any secure document carried by an RFID badge carrying person into an unsecured portion of a building can be tracked. Specifically, if one walks away from the document in one part of the building to the next, and if the document is not re-registered automatically (via another RFID reader means), then alarms, flags designed to go up in the network, will prompt security measures to check on the status of the document. This can be accomplished by creating (manually or automatically) an electronic message or page, and sending it over the network to the recipient pool. Accordingly, control over various documents is virtually real-time in determining whether a secure document is in possession of the authorized user or is alternatively replaced.

Another aspect of the present invention is that authorization codes, statuses and user-sets for access for certain locations may be dynamically changed. Specifically, when a person is working on a secure project for an extended period or specific period of time, wherein the person will have to travel from his or her home building A to buildings B and C or other remote authorized locations for an extended period of time or fixed period of time, the authorization for the person's entry into buildings B and C can be changed dynamically to allow access to both the buildings as well as any equipment therein. When that time expires, or the project is completed, the network automatically cancels the person's authorization to enter buildings B and C. It should be noted that global positioning system technology may be used to enhance the security system as an added feature in order to avoid having to create additional partitions or walls or other means of blocking access within a particular building.

Added applications of the user RFID badge of the present example of the present invention is that multiple users in a given geographical locus (e.g. a building) may be "daisy chained" meaning associated so that multiple users may receive a common message. More specifically, transponders associated with each of the user RFID badges could be configured in a daisy chain. The effect of this is that every time a message comes relative to one user, the same message can be broadcast or simulcast to the other users. The rationale behind this type of configuration of transponders is for purposes of convenience and effective communication.

For example, if three people are working on a secure program, and one of the three made some revision to the secure document by updating it electronically, person making the change must inform the other two people working on the secure program. Currently, the person making revisions manually informs the other two people either verbally or by sending a message (paper or electronic). But the present invention would eliminate this time-consuming repetition by allowing messages to be sent via daisy chain. Therefore, any upgrades or revisions or configuration control changes could be daisy chained to a specific group of authorized (need-to-know basis) related users. Thus, one month a particular daisy chain configuration can be provided, while next month, a different daisy chain could be specified; at the network (LAN/WAN) controller or server level.

Because the present invention is transaction based, the system may be used to provide security services to an equipment or building which can be billed to the user on a "per-use" basis. Accordingly, a summary of transactions may also be used for billing purposes because each security transaction could potentially also be a toll producing or toll accounting situation. Additional services which could also be toll producing would be options such as point-to-point transaction, multi-cast or broadcast transactions, or roaming features.

Another aspect is that information can be compressed and decompressed (off-line or real-time). Presently, there is a horrendous problem of storage of all of the paper logging transactions. However, if automated, this data may be compressed and stored in a much more compact fashion.

To facilitate these billing and transaction records, an additional mass-memory card (PCMCIA type) can be attached to the terminal device or plugged-in by users. The transactions may be stored on the additional embedded or removable mass-memory card(s), the equipment that is handling the transaction, or the network, or all three locations. The mass-memory card could potentially hold hundreds of megabytes of information which could be very important for auditability (e.g., quality compliance test data) and create a billing event. In addition, the auditability is a contractual requirement for projects sponsored by the DOD. Thus, the reports to the DOD could be sent in the form of a secure, unalterable PC card.

Automatic transactions of broadcast messages such as paging or voice messaging to pre-selected information gate keepers and auditors, etc. (user definable); multi-sensor, digital or analog, fusion software microcode which is user definable; RDBMS (Relational), OODB (Object-oriented database) compatible automatic identification or complete transaction abstracting capability such as historical data for custom report creation and transaction history packets by user, equipment, usage pattern, etc.; and support display or hard copy print options of user selectable secure information management related transactions.

Other applications include, but are not limited to integrated user, information and equipment or asset control; equipment calibration control and auditability control; a professional (lawyer, doctor, accountant, etc.) user information security system; information management and security in the pharmacy field as mandated by the FDA (e.g., controlled substance prescriptions tracking); security over personal property; and auditability and configuration control over the testing of products, production and test equipment to track UL, safety, OSHA, quality, FAA, FDA, etc. compliance.

It is noted that the above-disclosed information management and security system of the present invention may be provided commercially as a service on a "pay-per-use", i.e. transaction, basis.

EXAMPLE 3

Example 3 specifically relates to a pay-per-use application in the industry of intelligent electrophotographic toner and intelligent electrophotographic developer cassettes, and ink-jet and thermal transfer cassettes suitable for use in existing and emerging hard copy printing devices such as printers and copiers, as well as information transmission/input devices such as facsimile machines, modems, scanners, etc.

Currently, a problem exists in the electrophotographic toner and developer cassette industry. Unauthorized refurbishers either obtain empty used toner and developer cassettes or manufacture counterfeit toner and developer cassettes. Then, the unauthorized refurbishers reload same with inferior quality toner, developer, carrier or developing fluid (inks), and resell. The inferior quality toner used in violation of warranty can cause equipment breakdowns which are repaired at great expense under warranty due to the inability of the manufacturer to identify the warranty violation. With auditable ownership, any unacceptable recycling violating environmental/waste disposal laws can be tracked easily.

In order to prevent unauthorized refurbishing, this unique application of the present invention requires three main elements: (1) an RFID reader 508; (2) an RFID transponder 512; and (3) an external mass-memory 516 for storage of transaction data in the network server 502, peripheral 506 and/or in pluggable integrated circuit cards commonly known in the industry as PC cards. The RFID reader 508 may be embedded or plugged into the host printer/copier/fax/scanner and/or the refurbishing equipment.

With respect to an electronic, secure, tamper-proof transponder, such a transponder identification device 512 must be imbedded or attached into an insertable, reusable and disposable electrophotographic printing cassette 510 and/or "after market" toner/developer dispensing containers for further control. The transponder identification device 512 is preferably one of the following types: contact type or close proximity type (e.g., a Dallas semi, IC-type button or proximity "read" relay); a contactless, RFID device (e.g., a "TIRIS" read-only, read/write and programmable-type device, with a built-in time, date and place stamp capability and resident read-only memo/mass-memory).

The RFID transponder device 512 may also have a built-in temperature, humidity, oxygen, smoke particle, or ozone sensor, shown at 514, or a separate environmental sensor, not shown, embedded in the cassette 510 to track humidity or temperature conditions in storage, transit, and in actual use which would determine if the "warranty" is still valid for the printing toner/cassette. Another type of physical identification device is a read-only type having a bar-code, dot-code, or a laser-readable label.

The second system element required to facilitate pay-per-use transactions is an RFID reader device 508, 522. A suitable RFID reader device 508, 522 reads the electronic identification code(s) for the user, refurbisher, third-party service provider, etc., along with the toner consumption, usage, pages printed or reproduced, transmitted, refurbishing cycles, software or algorithm configuration, billing rate, etc. type business transaction data. The foregoing information is stored on the cassette RFID device 512 itself and/or a plug-in mass-memory card 516 in the peripheral 506. This RFID reader device 512 is preferably embedded in the following equipment elements: (1) system peripherals such as printers, copiers, facsimile machines, scanners, etc.; (2) printing cassette refurbishing/recycling equipment 518; (3) portable, hand-held readers, notebook/sub-notebook computers, terminals; (4) portable pagers; and (5) Portable Personal Digital Assistants (PDA) for integrated computing/communicating.

With respect to refurbishing/recycling equipment 518, refurbishing equipment 518 having a control, programming panel 520 connected to cassette reader module 522 embedded in refurbishing equipment 518. The programming panel 520 takes information from reader module 522 which obtained information from ID device 412 on cassette 510. Panel 520 then allows a mechanism, not shown, in equipment 518 to interlock (electro-mechanical keying) with cassette 510 and its sub-systems to allow refilling. A counterfeit housing will not carry ID device 512 and therefore will be unable to be refilled by an authorized refurbisher. If a counterfeit cassette is used to operate peripheral 506, information obtained from the reader module 508 or the mass-memory card 516 would not match information obtained from the reader module 522 of refurbishing equipment 518 or from a central refurbishing network controller or server. Accordingly, the manufacturer of peripheral 506 would be flagged that a warranty violation has occurred.

The third system element required to facilitate pay-per-use transaction records is a data communication device 504 such as a modem board, PC wired or wireless modem card, or a network/LAN card which is an integral or an add-on part of the above radio-frequency or bar-code/symbology reader device mentioned above, would facilitate transmission of the transaction data in a packetized and/or a bit-stream or a frame-relay format to a localized or centralized database 502.

In operation, the on-board, above-discussed electronic identification device 508 (read-only or read/write type) would positively identify the cassette 510, the user, the service provider, the OEM manufacturer, authorized locations for refurbishing, etc. The electronic identification device 512 may also store pertinent usage, consumption and date coded data on either resident memory on the transponder 512 or on the house peripheral 506 or the network server 502 resource, in an appropriate format and frequency, as defined by the manufacturer, refurbisher, or the end-user, on a real-time or pre-programmed basis.

The intelligent cassette 510 with one of the above-mentioned ID devices 512 on it, would prevent and prohibit cassette refurbishing by unauthorized vendors and end-users, because there will be an initialization handshake sequence between the newly inserted cassette 510 and the peripheral 506 (if the reader module is present) or the refurbishing equipment with the ID reader. Additional mechanical anti-tampering mechanisms can be incorporated so that until a successful, authorized handshake is confirmed on initialization, attempts to refill and/or operate the cassette 510 in the peripheral or mechanical disassembly would be foiled.

The positive, electronic ID makes it tamper-proof and readily provides data on toner/developer use, pages printed, remaining life (recycles available), conformance to minimum guaranteed print quality performance to the cassette vendor to facilitate a pay-per-use consumables charge-out mechanism. This direct control of the electrophotographic cassette 510 refurbishing also assures compliance to any local environmental regulations regarding the disposition of the toner/developer and other waste products.

This electronic ID-based control mechanism results in the ability to assure minimum threshold print set quality, useful life, and hassle-free automated logistics solution for the end-user, OEM, and third-party refurbishers with a full audit trail of all transactions.

When implemented, the following aspects of print quality may be controlled: cassette serial(s); configuration; end-user (s), refurbisher, service-provider identification; process technology control (new technology/revisions/upgrades, etc.); time, date, and location stamp of cassette original OEM manufacturing, refurbishing and update data; performance enhancement software, configuration and billing algorithm control (real-time and/or delayed update to vary billing rate to match consumption pattern, usage, quality performance, etc.); toner re-use, and recomposition data; a temperature humidity sensor data audit trail for warranty validation; OPC, Corona, Laser/LED/DMD, and other optics component usage, and replacement data; ability to gather enterprise-wise usage, quality, print cost and data aggregation.

In addition, certain aspects of the cassette life may be controlled such as original in-service date, number of refurbishing cycles, and number of services and dates of service; a tamper-proof record of use; cumulative pages printed; a usage environment cross-reference warranty validation; final disposition data; environmental compliance records; and ability for temperature and humidity monitoring throughout the life of the cassette.

Further, the implementation of this real-time configurable, re-configurable network system also benefits several aspects of logistics such as the ability to customize a program pay-per-use rate algorithm as well as customer-specific data of interest; provide automatic usage data with respect to historical analysis, trends, and forecasting; control of authorized users, and refurbishers; the ability to handle remote or field-generated refurbishing requests; and control pilfering by tying the recycling and refilling data to the actual toner usage.

EXAMPLE 4

Example 4 specifically relates to a pay-per-use application utilizing technology of the cellular communications industry.

Figure 6:
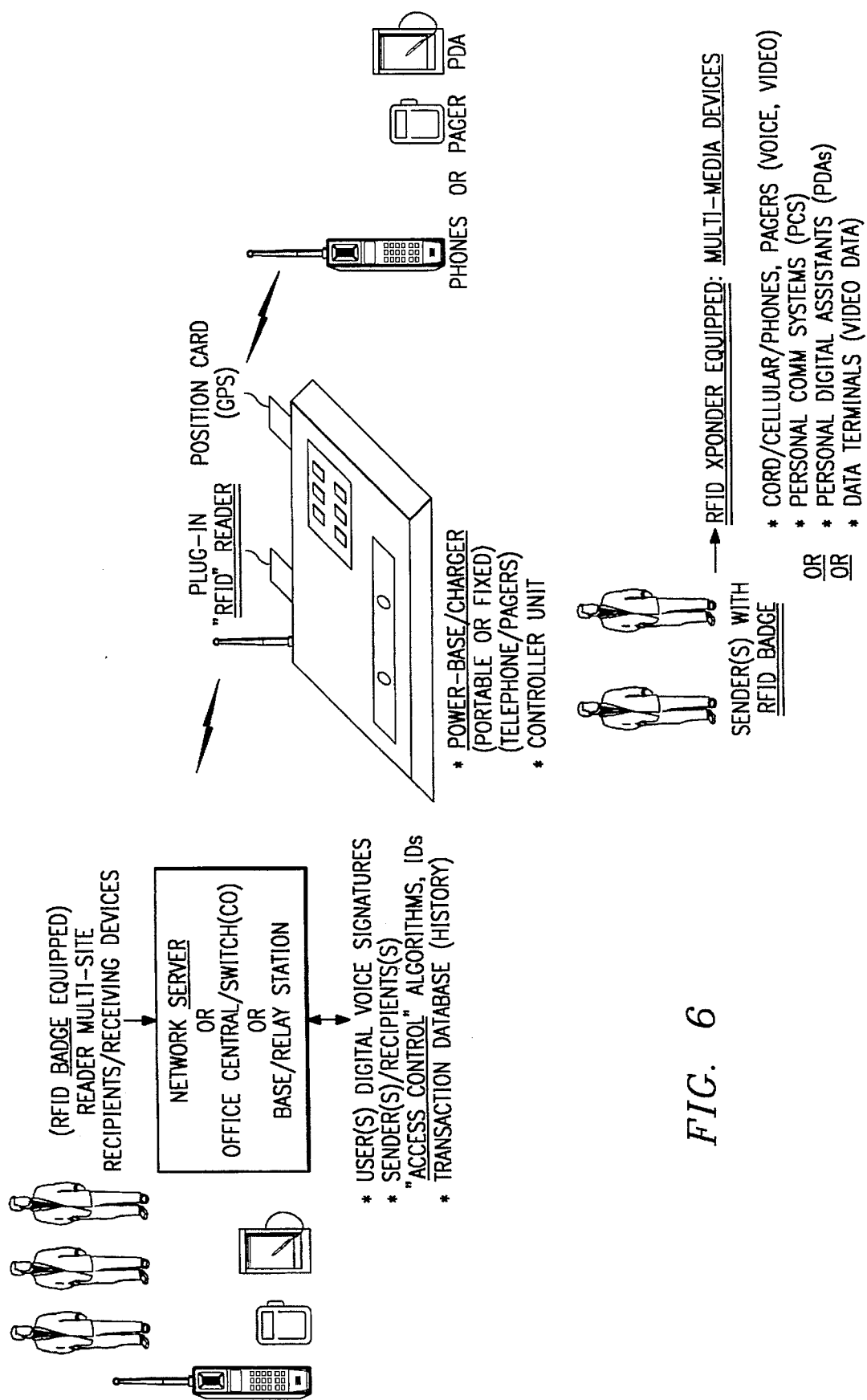
FIG. 6 illustrates a specific application of said information management and security system utilizing technology from the cellular communications industry.

In FIG. 6, this specific application is illustrated. In use, a sender is equipped with an RFID badge 618. RFID badge 618 may be of the type discussed earlier in Example 1 and in Example 2; therefore, RFID badge 618 may be independently powered or may accumulate energy from interrogation transmissions from portable, equipment-embedded RFID reader 602.

Multi-media communication devices are shown generally at 610. Multi-media devices 610 may include a telephone 612, cellular and portable, a personal digital assistant 616 similar to a product sold under the trade name of NEWTON by the Apple Corporation, or an alphanumeric two-way/one-way pager 614 which may take any form as discussed earlier in example 2.

In use, a sending individual equipped with RFID badge 618 is passively identified and activated (IDed) via Reader (RFID) in multi-media device 610. Upon activation, RFID reader 602 performs a handshake sequence with RFID badge 618. This may be accomplished by a plug-in card type RFID reader 606 embedded in the fixed base unit/charger, wherein RFID reader 606 is similar to that described earlier in example 2. Local host or server stored "digital voice signature" verification and authorization can also be deployed to provide additional security over the automatic RFID handshake sequence.

During the handshake sequence, plug-in card 606 may consult a local look-up table contained therein; alternatively, plug-in card 606 may verify the authorization of RFID badge 618 by communicating via antenna 604 of controller unit 603 to transaction data base 620 maintained in LAN network equipment types via wired or cellular communication. Transaction data base 620 is a generic term which encompasses a network server/host or a central office switch of a local telephone company, or a base/relay station within the local wired (PSTN) or cellular telephone network or the like. Transaction data base 620 verifies the authorization of RFID badge 618 and transmits same via cellular technology to controller unit 603 via controller unit antenna 604. Upon receipt of authorization, controller unit 603 allows multi-media device 610 to be activated.

The sender, now authorized, inputs the receiving individual's phone number or other identification to initiate a communications link with a receiving individual wearing RFID bade 622.

To establish the link, controller unit 603 passes the request to transaction data base 620. Transaction data base 620 evaluates whether sender with RFID badge 618 is authorized to communicate with recipient with RFID badge 622. Once authorized, transaction data base 620 establishes a link with receiving multi-media devices shown generally at 624.

Receiving multi-media devices may include telephones 626, personal digital assistant 628, or pager 630 similar to sending multi-media devices 610.

When receiving multi-media device rings (or beeps, or a light blinks, etc.) recipient having RFID badge 622 activates multi-media device 624. As soon as recipient having RFID badge 622 activates multi-media device 624, a plug-in card or RFID reader module 606 of receiving controller unit 603 interrogates RFID badge 622 to verify that the intended recipient is indeed receiving the communication.

Controller unit 603 may also be equipped with a GPS position card 608. It should also be noted that an additional level of security may be afforded by use of GPS position card 608 shown inserted into controller 603 although it may alternatively be fixed to multi-media devices 610 and 624. Position card 608 may be interrogated by or otherwise programmed to automatically broadcast or transmit location information to) transaction data base 620 to verify whether either the sender or recipient is in an authorized, predetermined, or dynamically programmed location.

It should also be noted that the transmission "packet" encryption scheme discussed in the previous examples 1 and 2 are also applicable in this venue to avoid eavesdropping or airborne packet interception on cellular communication frequencies.

In view of the foregoing description of the present invention and various embodiments, it will be seen that the several advantages of the invention are achieved.

The embodiments were chosen and described in order to best explain the principles of the invention and its practical application to thereby enable others skilled in the art to best utilize the invention in various embodiments and with various modifications as are suited to the particular use contemplated.

Figure 7:
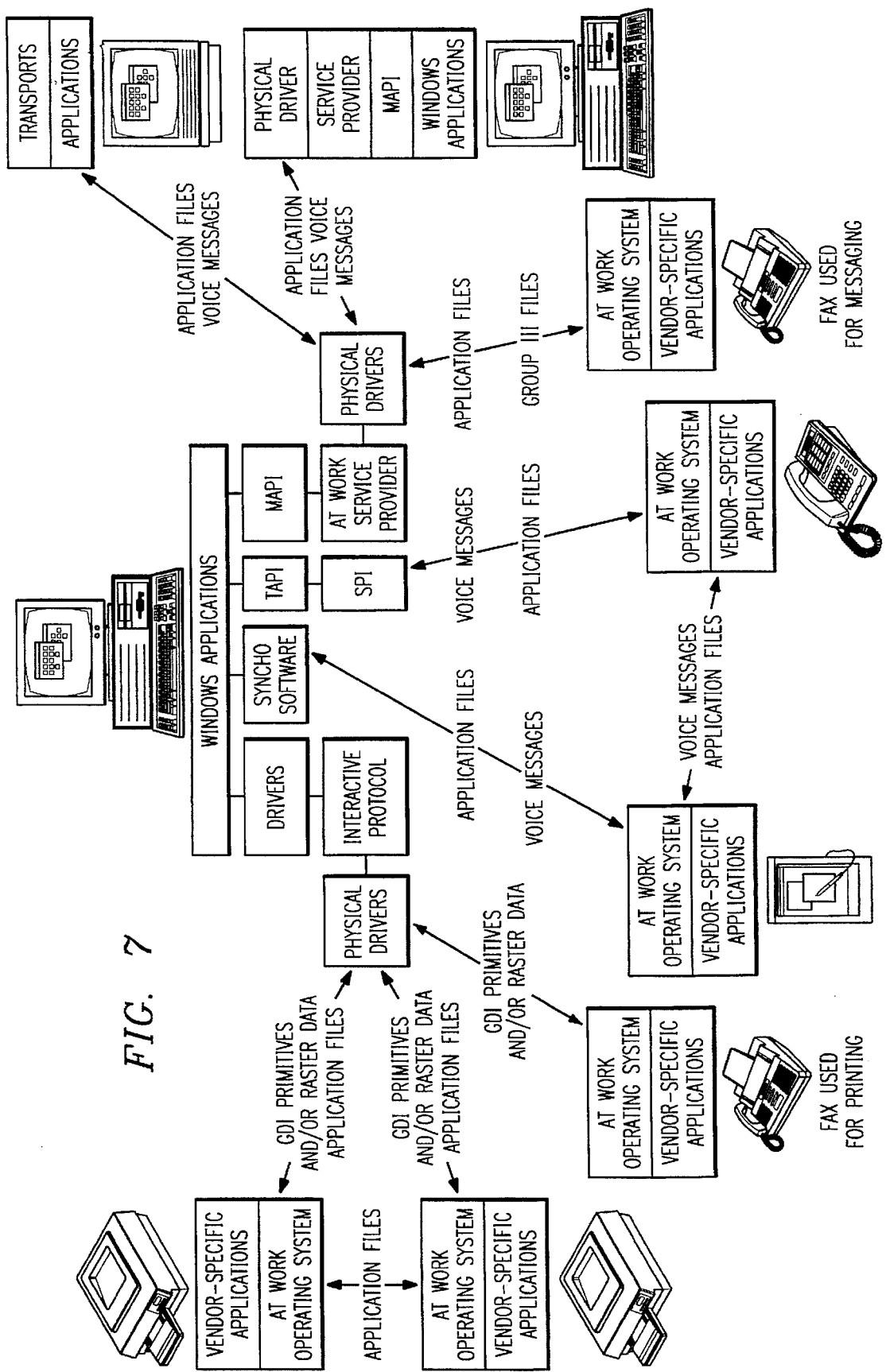
FIG. 7 illustrates a planned computer based system which allows electronic signal interaction between various network devices.

As various modifications could be made in the constructions and methods herein described and illustrated without departing from the scope of the invention, it is intended that all matter contained in the foregoing description or shown in the accompanying drawings shall be interpreted as illustrative rather than limiting. For example, the concept presented in example 2 may be extended to track hazardous waste (nuclear, chemical, medical) products by attaching a user RFID badge waste handlers, equipments to each hazardous waste container to verify proper storage, movement, handling, and disposal. Eliminating the "person-in-the-loop" is advantageous because it reduces the potential for inadvertent exposure while providing continuous surveillance over a large number of hazardous waste storage containers. In another example of the scope of the present invention, it is contemplated that an application-specific memory (ASM) device may also be incorporated into the system to let the user, OEM, or service-provider collect data in unique formats, frequency and storage patterns so as to minimize the data "access time" and optimize output formats for statistical analysis purposes. In yet another example, it is contemplated that the foregoing Example 4 may be extended to video-phone, video-conferencing, and voice-mail systems. It is further pointed out that the present invention could eliminate the need for an individual to remember passwords prior to logging on to a computer station by performing security functions transparent to the individual. In yet another example, FIG. 7 shows a computer managed system currently under development by the Microsoft Corporation. The present invention may be utilized in conjunction with the planned system disclosed in FIG. 7 to provide a comprehensive information management and security dimension consistent with the various embodiments of the present invention described above. Thus, the breadth and scope of the present invention should not be limited by any of the above-described exemplary embodiments, but should be defined only in accordance with the following claims appended hereto and their equivalents.

What is claimed is:

1. An information management and security system comprising:

a transponder having an identification code, said transponder including a charge storage element for storing energy received from an interrogation signal, said transponder subsequently using the stored energy to power the transmission of said identification code;

an transceiver to send said interrogation signal to said transponder and to receive said identification code from said transponder;

a first terminal device connected to and activated by said transceiver;

a host network element in communication with said transceiver, said host network element having authorized identification codes stored in memory, whereby said host network element compares the identification of said transponder with the authorized identification codes stored in memory; and a second terminal device connected to said host network element for communicating with said first terminal device after said host network element has verified the authorized identification of said transponder.

2. An information management and security system as set forth in claim 1, wherein prior to allowing communication between said first terminal device and said second terminal device said transceiver interrogates said transponder which causes said transponder to respond by broadcasting identification signals so that said transceiver receives the identification signals and communicates the identification signals to said host network element which authenticates the authorization of said transponder by comparing the identification signals with said authorized identification codes stored in said memory of said host network element.

3. An information management and security system as set forth in claim 1, wherein said transponder comprises a Personal Computer card having an transponder, mass memory, and input/output data means.

4. An information management and security system as set forth in claim 3, wherein said mass memory of said transponder is application specific memory.

5. Information management and security system as set forth in claim 1 wherein said transponder comprises an RF transponder.

6. An information management and security system as set forth in claim 3, wherein said transponder further comprises a battery power source.

7. An information management and security system as set forth in claim 1, wherein said transceiver writes a record of the transaction on said transponder.

8. An information management and security system as set forth in claim 3, wherein said transponder further comprises encryption means to encrypt signals emitted from said transponder.

9. An information management and security system as set forth in claim 8, wherein said encryption means comprises a random number seeding.

10. An information management and security system as set forth in claim 9, wherein said encryption means further comprises an encryption chip.

11. An information management and security system as set forth in claim 8, wherein said encryption means further comprises an integrated encryption and packetization chip.

12. An information management and security system as set forth in claim 1, wherein said transponder stores unique biographical information of a user of said transponder in Read Only Memory.

13. An information management and security system as set forth in claim 1, wherein said transceiver connected to said first terminal device writes the transaction on said singular transponder.

14. An information management and security system as set forth in claim 1, wherein said transceiver connected to said first terminal device stores a record of the transaction in memory.

15. An information management and security system as set forth in claim 1, wherein said transceiver connected to said first terminal device writes the transaction on said host network element.

16. An information management and security system as set forth in claim 1, wherein a request for a transfer of data between said first terminal and said second terminal is automatically stamped with the location, date and time of the request and stored in memory in said transceiver.

17. An information management and security system as set forth in claim 1, wherein said host network element records the identification communicated by said transponder.

18. An information management and security system as set forth in claim 1, wherein said transponder communicates with an environmental sensor.

19. An information management and security system as set forth in claim 18, wherein said environmental sensor detects an environmental condition selected from the group consisting of humidity, temperature, ozone, oxygen, and smoke particles.

20. An information management and security system as set forth in claim 1, wherein said first terminal device is selected from the group consisting of printers, copiers, pagers, personal digital assistants, personal computers, dumb terminals, workstations, facsimile machines, telephones, cellular phones, Video Cassette Recorders, radios, electronic door mechanisms, mass memory storage devices, data storage devices, automated teller machines, or modems.

21. An information management and security system as set forth in claim 1, wherein said second terminal device is selected from the group consisting of printers, copiers, pagers, personal digital assistants, personal computers, dumb terminals, workstations, facsimile machines, telephones, cellular phones, Video Cassette Recorders, radios, electronic door mechanisms, mass memory storage devices, data storage devices, automated teller machines, or modems.

22. An information management and security system as set forth in claim 1, wherein said host network element is selected from the group consisting of network servers, network controllers, central office switches, or base relay stations.

23. An information management and security system as set forth in claim 20, wherein said second terminal device is selected from the group consisting of printers, copiers, pagers, personal digital assistants, personal computers, dumb terminals, workstations, facsimile machines, telephones, cellular phones, Video Cassette Recorders, radios, electronic door mechanisms, mass memory storage devices, data storage devices, automated teller machines, or modems.

24. Information management and security system as set forth in claim 1 wherein said transponder comprises an optical transponder.

25. Information management and security system as set forth in claim 1 wherein said transponder comprises an infrared transponder.

26. Information management and security system as set forth in claim 1 and further comprising a third terminal device connected to said host network element for communicating with said first terminal device after said host network element has verified the authorized identification of said RFID transponder.

27. An information management and security system comprising:
 a first security badge including a transponder, a mass memory and an input/output circuit;
 a first transceiver to wirelessly send and receive signals to and from said first transponder, said first transceiver to continuously transmit a broadcast signal until receiving a response from said first security badge and then, upon receipt of said response, said transceiver to receive a first authorization code from said first security badge and to store a record of the receipt of the authorization code;
 a first terminal device connected to and activated by said first transceiver;
 a second security badge including a transponder, a mass memory and an input/output device;
 a second transceiver to send and receive signals to and from said second RFID transponder, said second transceiver to continuously transmit a broadcast signal until receiving a response from said second security badge and then, upon receipt of said response, said second transceiver to receive a second authorization code from said second security badge and to store a record of the receipt of the authorization code;
 a second terminal device connected to and activated by said transceiver; and
 a host network element in communication with said first transceiver and said second transceiver, said host network element to receive the first authorization code from the first transceiver and the second authorization code from the second transceiver and compare the first and second authorization codes with at least one host authorization code, said host network element to send a first verification code to the first transceiver upon verification of the first authorization code and to send a second verification code to the second transceiver upon verification of the second authorization code.

28. A method of securing access to a terminal device, said method comprising the steps of:
 providing an authorized user with a security badge which includes a personal computer card, a read/write transponder, a mass memory and a input/output data circuit, said transponder electronically storing an identification code; and
 associating a transceiver with said terminal device, said transceiver being operable to communicate with said terminal device;
 wherein said authorized user gains access to said terminal device by:
  (a) bringing said security badge within a selected distance of said transceiver, said security badge located so that it is not physically visible so that said transponder is not within line-of-sight with said transceiver;
  (b) transmitting an interrogation signal from said transceiver;
  (c) receiving said interrogation signal at said security badge and storing said interrogation signal within a charge storage device within said security badge;
  (d) transmitting said identification code from said security badge to said transceiver wherein the transmitting is powered by energy derived from said charge storage device;
  (e) receiving said identification code at said transceiver; and
  (f) verifying said identification code; wherein steps (b)–(f) are performed without said transponder being physically visible.

29. The method of claim 28 wherein said terminal device comprises a computer.

30. The method of claim 28 and further comprising the step of storing said interrogation signal within a charge storage device within said transponder unit wherein said step of transmitting said identification code is powered by energy derived from said charge storage device.

31. A method of securely communicating information between two locations comprising:
 requesting an information transfer from a first location to a second location;
 interrogating a radio frequency identification (RFID) transponder at said second location from a radio frequency (RF) transceiver at said second location;

transmitting an identification code from said RFID transponder at said second location to said RF transceiver at the said second location;

transmitting said identification code from said second location to a third location, said third location remote from said first and second locations;

comparing the authorization of said identification code with authorized identification codes stored in memory at said third location;

communicating an authorization signal from said third location; and transmitting the requested information in packets to said second location after the authorization is verified, each of the packets of information including a header, the information to be transferred and a footer wherein the header includes an identification number for a user at the first location, an identification number for a receiver at the second location, a date/time stamp and a location stamp.

32. A method of securely communicating information between two locations comprising:

requesting an information transfer from a first location to a second location;

interrogating a radio frequency identification ("RFID") transponder at said first location from a radio frequency ("RF") transceiver at said first location;

transmitting an identification code from said RFID transponder at said first location to said RF transceiver at said first location;

transmitting said identification code from said first location to a third location, said third location remote from said first and second locations;

comparing the authorization of said identification code with authorized identification codes stored in a memory at said third location;

communicating an authorization signal from said third location; and transmitting the requested information in packets to said second location after the authorization is verified, each of the packets of information including a header, the information to be transferred and a footer wherein the header includes an identification number for a user at the first location, an identification number for a receiver at the second location, a date/time stamp and a location stamp.

33. A method according to claim 32, wherein the step of transmitting the requested information to said second location after the authorization is verified, comprises the steps of:

storing the information requested for transfer in memory;

interrogating a radio frequency identification ("RFID") transponder at said second location from a radio frequency ("RF") transceiver at said second location;

transmitting an identification code from said RFID transponder at said second location to said RF transceiver at said second location;

comparing the authorization of said identification code with authorized identification codes stored in memory; and transmitting the requested information to said second location after the authorization of the identification code of the RFID transponder at the second location is verified.

34. A method according to claim 33, wherein the step of transmitting the requested information to said second location after the authorization of the identification code of the RFID transponder at the second location is verified, comprises the step of:

transmitting the requested information to a terminal device at said second location, said terminal device being in communication with said RF transceiver at said second location.

35. A method according to claim 33, wherein the method further comprises the steps of:

encrypting the information transmitted to said second location; and decrypting the information received at said second location.

36. A method according to claim 32, wherein the step of comparing the authorization of said identification code with authorized identification codes stored in memory is performed by a host network element.

37. A method according to claim 32, wherein the step of comparing the authorization of said identification code with authorized identification codes stored in memory is performed by said RF transceiver.

38. A method according to claim 32, wherein the method further comprises the steps of:

encrypting the identification code transmitted from said RFID transponder; and decrypting the identification code at said RF transceiver.

39. A method according to claim 33, wherein the method further comprises the step of:

recording the date and time of each request for information transfer.

40. A method according to claim 34, wherein the method further comprises the step of:

recording the location of each request for information transfer.

41. A method according to claim 33, wherein the method further comprises the step of:

recording the date and time of each information transfer from said first location to said second location is completed.

42. A method according to claim 33, wherein the method further comprises the step of:

recording the location of destination of each information transfer.

* * * * *